United States Patent

[11] 3,584,758

| [72] | Inventors | Robert D. Moore<br>6270 Seton Hill St., Dayton, Ohio 45459;<br>Frank J. Garner, Dayton, Ohio |
|---|---|---|
| [21] | Appl. No. | 764,107 |
| [22] | Filed | Oct. 1, 1968 |
| [45] | Patented | June 15, 1971 |
| [73] | Assignee | said Robert D. Moore, by said Frank J. Garner<br>Dayton, Ohio |

[54] BATTERY TRAY
5 Claims, 10 Drawing Figs.

[52] U.S. Cl. .................................................. 220/21,
156/182, 220/83, 206/2
[51] Int. Cl. .................................................... B65d 1/24,
B65d 11/20, B65d 25/04
[50] Field of Search ........................................... 220/20, 21,
22, 83; 206/2

[56] References Cited
UNITED STATES PATENTS

| 2,141,791 | 12/1938 | Keller............................. | 206/2 |
| 2,731,376 | 1/1956 | Rusch............................ | 206/2 X |
| 3,150,792 | 9/1964 | Bright............................ | 220/83 X |
| 3,215,576 | 11/1965 | Huff............................... | 220/83 X |

*Primary Examiner*—George E. Lowrance
*Attorney*—Dybvig & Dybvig

ABSTRACT: Several cell casings forming compartments for receiving battery cells made from resin filled with fiberglass are integrally joined together using resin and fiberglass to form an inner boxlike structure having compartments separated by partitions which is inserted into an outer boxlike structure made from the same material. The resultant battery tray is of a unitary construction having dimensionally stably and uniform partitions. The polyester resin and fiberglass are laid up in such a manner as to resist bending of the tray along its length when it is lifted from the ends thereof. This is accomplished in part by providing thicker walls along the length of the tray than the partition walls transverse to the length of the tray.

PATENTED JUN 15 1971 3,584,758

INVENTORS
FRANK J. GARNER
ROBERT D. MOORE
BY
Dybvig and Dybvig
HIS ATTORNEYS

PATENTED JUN 15 1971
3,584,758
SHEET 2 OF 2
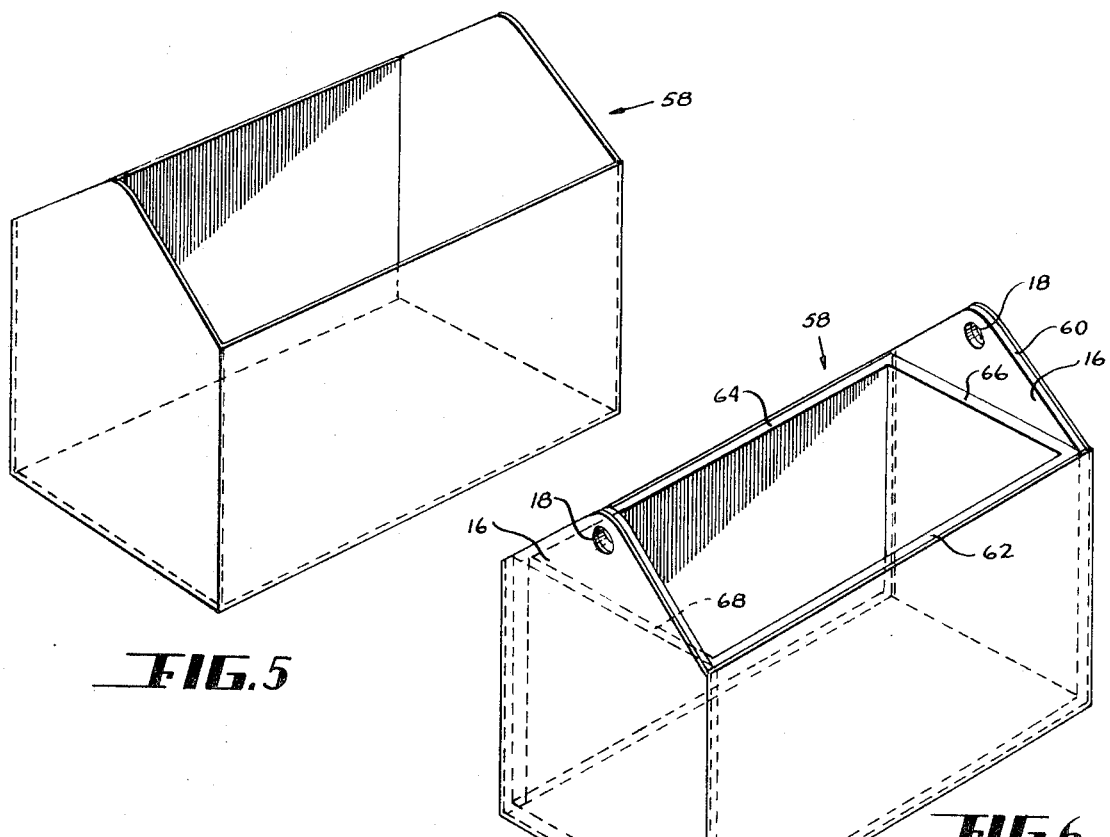
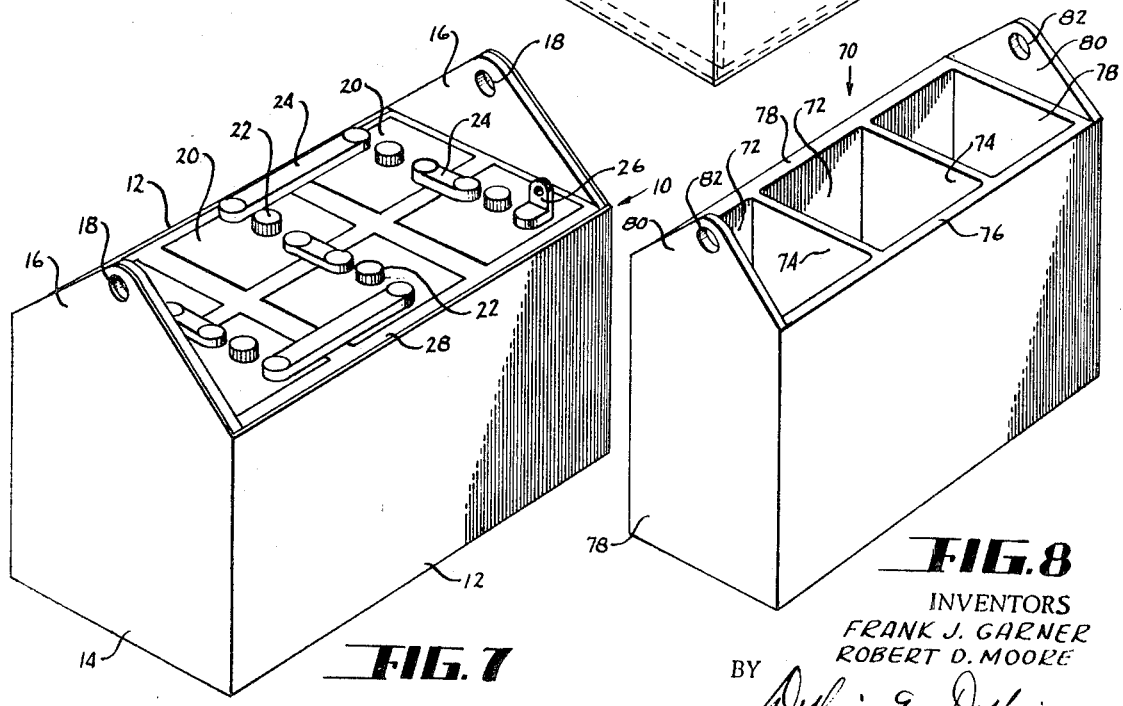
INVENTORS
FRANK J. GARNER
ROBERT D. MOORE
BY
HIS ATTORNEYS

BATTERY TRAY

This invention relates to a battery tray made of resin filled with fiberglass, especially that type of massive, heavy storage battery tray used to power industrial trucks or the like, and to a method of manufacturing the same.

Trays for most large storage batteries are made from steel because the steel trays are rugged and can be handled by hooks or other lifting devices without any real danger of breaking or bending the trays. However, steel battery trays are corroded by battery acids and sometimes by environmental conditions in which the battery is used. The corrosion may result in the loss of the seals between the individual battery cells. Any corrosion adversely affects the operation of the battery and may result in permanent cell damage. Also, stray currents and unwanted ground connections may develop when storage batteries having steel trays are overfilled with acid.

An object of this invention is to provide a storage battery tray and method of manufacturing the same, the tray being made from a material having insulating properties which is substantially free from attack by battery acid. In accordance with this invention a tray is made of plastic resin filled with fiberglass. Polyester resins are preferred because of their dimensional stability and their resistance to acid attack.

Further it is an object of this invention to provide a storage battery tray and method of manufacturing the same from resin, such as polyester, filled with fiberglass and which has a great resistance to bending along the longer sides thereof when lifted by hooks or the like in transport. Also, it is an object to provide such a tray which is of a rugged construction to withstand the severe abuses encountered during use in industrial trucks and the like and which will not be deformed under the weight of filled battery jars.

Still another object of this invention is to provide such a battery tray having compartments therein with straight parallel sidewalls of accurate dimensions for receiving a predetermined number of battery cells which, because of their accurate dimensions, assist in supporting the cell jars and eliminate the need for shimming around the cell jars to adjust their positions in the battery tray. This is accomplished in accordance with this invention by separately forming the cell jar compartments as hollow, tubular members with straight sidewalls and then joining the separately formed members to form a boxlike inner cell assembly open at its top with partitions formed by adjoining sidewalls of the members. Because so formed, the sidewalls can be made as stiff and rigid as desired as well as as straight as desired. The inner cell assembly is then assembled into an outer case which preferably is formed with upstanding handles at each end thereof.

Other objects and advantages will become apparent from the following description and the drawings in which:

FIG. 5 is a perspective view of an outer case;

FIG. 6 is a perspective view of the outer case of FIG. 5 being prepared for receiving the inner cell casings;

FIG. 7 is a perspective view of a storage battery including the battery tray of FIG. 1;

FIG. 8 is a perspective view of another form of battery tray having only a single row of compartments;

Figure 1:
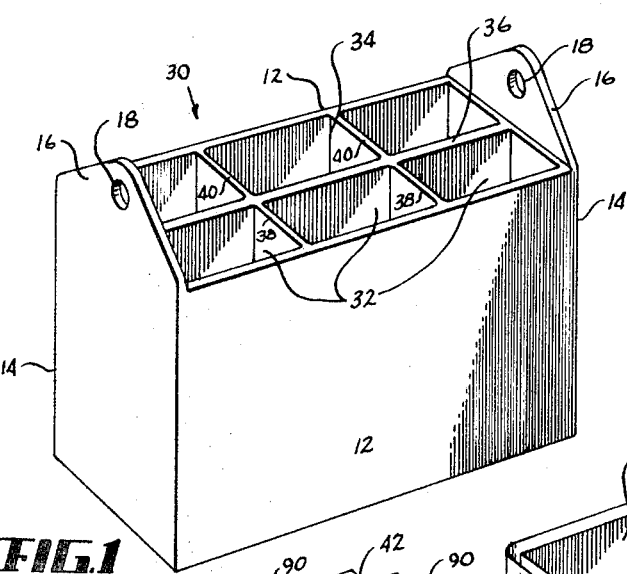
FIG. 1 is a perspective view of a completed storage battery tray made in accordance with this invention.

Referring first to FIG. 7, a storage battery, generally designated 10, comprises a generally boxlike member having front and rear walls 12 and end walls 14 with handle portions 16 generally coplanar with and projecting upwardly from the end walls 14. Aligned apertures 18 extend through the handle portions 16 for the receipt of bars or hooks (not shown) used in handling and transporting the battery 10. Batteries such as the battery 10 intended for use in industrial trucks are quite heavy, weights in the range of a ton or more being common.

The battery 10 further includes a plurality of battery cell jars 20 arranged in rows therein, each cell jar 20 commonly having fill ports for battery acid closed by fill plugs 22. A plurality of conducting straps 24 interconnect the terminals of the cell jars 20 but for a pair of terminals, one of which is indicated at 26, for external connections. The area around the top of the cell jars 20 may be filled with a tar or the like sealing compound as indicated at 28.

Referring now to FIG. 1, the battery 10 in accordance with this invention is made from a battery tray, generally designated 30, in which the cell jars 20 of FIG. 7 are inserted, the tray 30 comprising the front and rear walls 12 and end walls 14 shown in FIG. 7. The tray 30 further includes two rows of battery cell receiving compartments 32 and 34 separated by a longitudinal, center partition 36 extending between the end walls 14 and parallel to the front and rear walls 12. The three compartments 32 are separated by transverse partitions 38 whereas the three compartments 34 are separated by transverse partitions 40 aligned with the partitions 38.

The battery tray 30 is of a rigid, unitary construction made of a resin, preferably a polyester resin, filled with fiberglass and designed to have maximum strength or resistance to bending along its longer dimensions so that it may safely be handled when hooks or the like are inserted in the apertures 18. To this end, the front and rear walls 12 and the center partition 36 are thicker than the partitions 38 and 40. Also, the end walls 14 and the bottom wall of the tray 30 are of a thick construction made from several layers of woven fiberglass roving and resin as will be described below.

The cell jars 20 are normally made from rubber, polyethylene or another soft plastic material and may become deformed from internal pressures created during operation of the battery. Accordingly, each of the compartments 32 is desirably of a size to snugly receive either one or two cell jars 20. There are six cell jars 20 in FIG. 7; hence the compartments 32 in this case snugly receive only one cell jar 20. The sidewalls of each of the compartments 32 and 34 formed by the walls 12 and 14 and the partitions 36, 38 and 40 should be straight sided and dimensionally stable in order to assist in retaining the shape of the battery cell jars 20 and to provide an adequately rigid structure.

Figure 2:
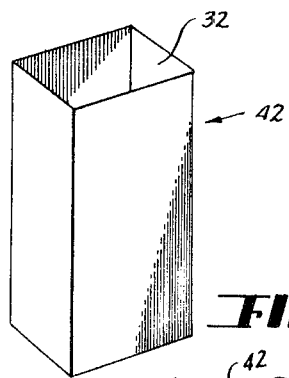
FIG. 2 is a perspective view of an inner cell casing forming a compartment for one or more battery cell jars in accordance with this invention.

In accordance with this invention, the characteristics of the battery tray 30 described above are obtained by separately molding units thereof and assembling the units together with layers of resin filled with woven fiberglass roving and fiberglass mat. Referring to FIG. 2, the basic unit of the tray 30 comprises an inner cell casing 42 of a hollow, rectangular tubular construction closed at its lower end. The hollow inside of the inner cell casing 42 is the same as an individual compartment 32 of the completed tray 30. The inner cell casing 42 is constructed over a collapsible male mold member (not shown) of any conventional construction and is comprised of one or more layers of woven fiberglass roving (not shown) soaked with resin. If desired, a layer of thin fiberglass mat (not shown) may be laid between two layers of woven roving. Those skilled in the art will understand that the internal dimensions of the inner cell casings 42 can be held to quite close tolerances because the casings 42 are formed over male molds. The preferred resin is an air inhibited polyester resin which is permitted to partially cure to the "green" stage. Accordingly, when the collapsible male mold member is removed in the forming of an inner cell casing 42, the casing 42 will be of a self-supporting shape with its outer surfaces slightly tacky to the touch.

Figure 3:
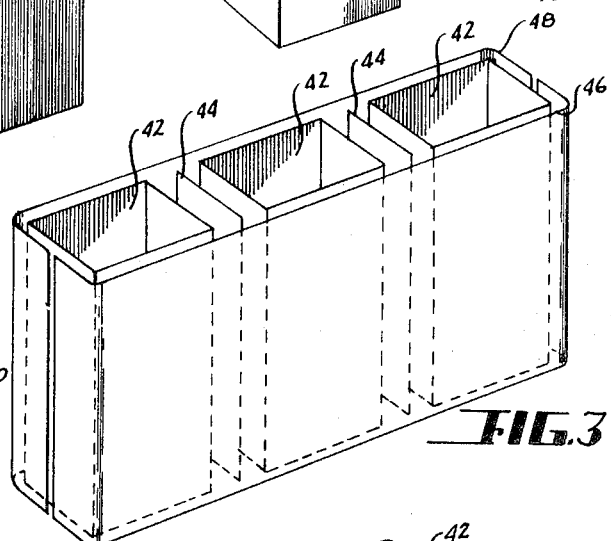
FIG. 3 is an exploded perspective view illustrating the manner in which separately formed inner cell casings are joined together to form a row of partitioned compartments.

Three preformed inner cell casings 42 are assembled together in the manner illustrated in FIG. 3 with a layer of thin fiberglass mat 44 soaked with resin sandwiched between the adjoining faces of the adjacent inner cell casing 42. This subassembly of three cell casings 42 which form the row of compartments 32 is then wrapped by a layer of woven fiberglass roving soaked in resin. For convenience, the wrapping of the roving can be accomplished as shown in FIG. 3 by using two sheets of roving 46 and 48 which completely cover the longer sides of the row of casings 42, the two sheets 46 and 48 meeting at the ends of the row of casings 42.

When laying up the woven fiberglass roving on the male molds and in forming the inner cell casings, roving cut along the grain is placed on the molds with the glass fibers oriented in substantially parallel relation to the side and bottom edges of the molds. Accordingly, the inner casings 42 are made dimensionally stable and retain their straight sided construction even when the resin is still in the green or partially cured stage. The sheets of roving 46 and 48 are similarly laid with their fibers oriented parallel to the end and bottom marginal edges of the joined cell casings 42. The fiberglass mats 44 contain randomly oriented fibers which give impact resistance to the partition formed thereby.

Figure 4:
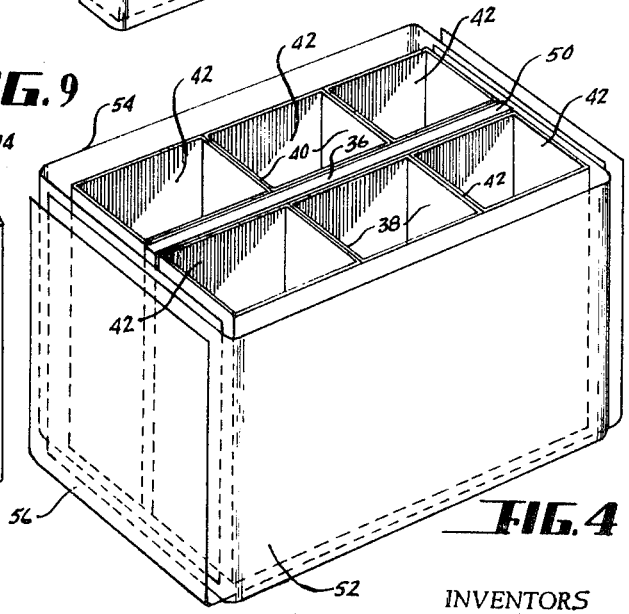
FIG. 4 is a partially exploded perspective view illustrating two rows of inner casings joined together and prepared for assembly into an outer case.

To form the six compartments 32 and 34 of FIG. 1, two rows of casings 42 are joined together along their longer sides as illustrated in FIG. 4 with a layer of thick fiberglass mat 50 soaked with resin sandwiched therebetween. The two rows of inner cell casings joined together as illustrated in FIG. 4 form an inner cell assembly which is of a self-supporting boxlike construction. At this point the resin used in forming the inner cell assembly is still in a green stage so that a good bond will be obtained when the inner cell assembly is subsequently joined to an outer case as will be described below. It will also be observed in FIG. 4 that, at this time, the center partition 36 as well as the transverse partitions 38 and 40 are now completely formed, the center partition 36 including the layer of thick fiberglass mat 50, the woven fiberglass rovings 46 and 48 as well as the adjacent sides of the inner cell casings 42. The transverse partitions 38 and 40 on the other hand are thinner than the partitions 36 because each of the transverse partitions is formed from the adjacent sides of inner cell casings 42 and a layer of thin fiberglass mat 44.

The inner cell assembly thus formed is then wrapped by sheets of woven fiberglass roving 52 and 54, each of which extends completely along one side and both ends of the inner cell assembly, the two sheets 52 and 54 completely overlapping along each end. A third sheet of woven fiberglass roving 56 is laid along the bottom and each end of the inner cell assembly. These three sheets of woven roving also have fibers oriented parallel to the side and end edges of the inner cell assembly for maximum resistance to distortion of the shape thereof. If desired, layers of thin mat may also be wrapped with the three sheets of woven rovings 52, 54 and 56 to further increase the impact strength of the wrapped inner cell assembly. Because of the relatively thick center partition 36 and the wrapping of the inner cell assembly by the resin soaked layers of woven roving 52, 54 and 56, the wrapped inner cell assembly has considerable strength and resistance to bending strain.

The wrapped inner cell assembly of FIG. 4, when completed, is ready for insertion into a rectangular, boxlike outer case 58 which is open at its upper end as shown in FIGS. 5 and 6. Because of its large size, the outer case 58 can most conveniently be laid up in a female mold (not shown) from layers of woven fiberglass roving and mat soaked with a resin, again preferably polyester. The first layer of resin laid in the female mold may be a colored gel coat which gives the outer casing a pleasing external appearance. The gel coat is then followed preferably by a layer of woven roving, a layer of mat and then another layer of woven roving all filled with resin. Further to increase the strength or resistance to bending along its longer dimensions, at least three or four additional layers 60 of woven fiberglass roving soaked with resin are laid inside the bottom and the ends of the outer case 58. For maximum strength, the sheets of roving used to form the layers 60 are continuous sheets cut on the grain with the fibers oriented parallel to the margins of the outer case 58. After the outer case 58, including the layers 60, has cured to a green stage, the apertures 18 can be drilled in the handle portions 16 thereof.

At this stage in the manufacture of the battery tray 30, the wrapped inner cell assembly of FIG. 4 is inserted into the outer case 58. To enhance the impact resistance of the completed tray 30, a layer of resin filled with fiberglass mat, comprising four sheets of mat 62, 64, 66 and 68, is sandwiched between the outside of the wrapped inner cell assembly and the inside of the outer case 58. It is possible to accurately predetermine the internal length of the opening in the outer case 58 by the thickness and number of layers 60 along the bottom and end walls thereof so that, when the wrapped inner cell assembly of FIG. 4 is inserted in the outer case 58 with the sheets 66 and 68 sandwiched between the confronting ends thereof, there will be no gaps or air spaces therebetween. Any gap or air space between the longer sides of the inner cell assembly and the outer case 58 can conveniently be filled with a suitable filler material and for this purpose we prefer to use polyester resin filled with sand.

The bonding of the inner cell assembly to the outer case 58 takes place while the resin forming these units is still in a green or partially cured stage so that the uncured resin in the sheets 62, 64, 66 and 68 forms a good bond with both the wrapped inner cell assembly and the outer case 58. When all of the resin forming the battery tray 30 is fully cured, the resultant structure is a unitary structure of which the various units such as the inner cell casings 42 and layers of roving and mat are integrally joined and cannot separately be detected on mere visual inspection.

As apparent from the foregoing description the transverse partitions 38 and 40 each have at least two layers of resin filled with woven fiberglass roving separated by at least one layer of resin filled with a fiberglass mat. The partitions 38 and 40 accordingly are resistant to distortion or deformation as well as to lateral impact. The center partition 36 in addition to the foregoing layers of woven roving has the additional layers of roving 46 and 48 as well as the thick mat 50, all soaked with resin. This coupled with the strength inherent in the end walls and bottom wall of the tray 30 resulting from the several layers of resin filled with woven roving sheets 52, 54 56 and 60 results in a high resistance to distortion or deformation. Along the lengths of the tray 30 immediately below the apertures 18 to which hooks or other lifting devices are applied, the sidewalls 12, although not as thick as the end walls 14, also include several layers of roving and a layer of mat and are essentially of the same character as the center partition 36. Thus it is seen that the tray 30 is resistant to bending forces and impact forces in any and every direction and thus is of a highly rugged construction easily capable of withstanding the abuses of ordinary use in industrial trucks and the like. Further because the tray 30 is assembled as described above, the partitions 36, 38 and 40 as well as the walls of the inner casing assembly function as braces which prevent buckling or other deformation of the walls 12 and 14 of the tray 30 when filled battery cell jars 20 are inserted therein.

It is to be understood that the battery trays could be built following the method of this invention with other than six cell receiving compartments by merely changing the number of inner cell casings 42 forming any joined row of cell casings and by changing the number of rows of cell casings 42. Thus, in FIG. 8 a battery tray 70 is illustrated having only three cell receiving compartments, designated 72, separated by transverse partitions 74 and having thick sidewalls 76 and end walls 78 provided with upstanding handle portions 80 having aligned apertures 82 therethrough.

Figure 9:
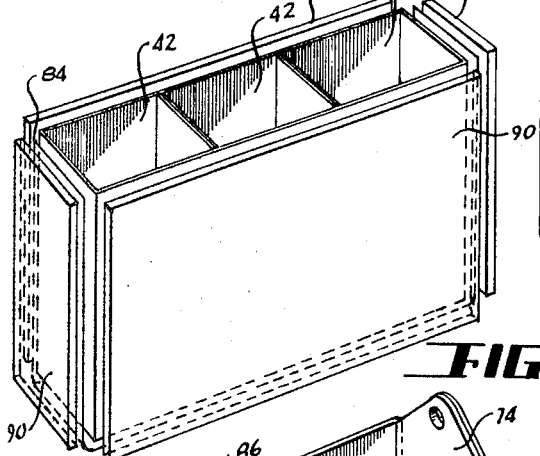
FIG. 9 is a partially exploded perspective view of an inner cell assembly and layers of resin and fiberglass used in the manufacture of the battery tray of FIG. 8.
Figure 10:
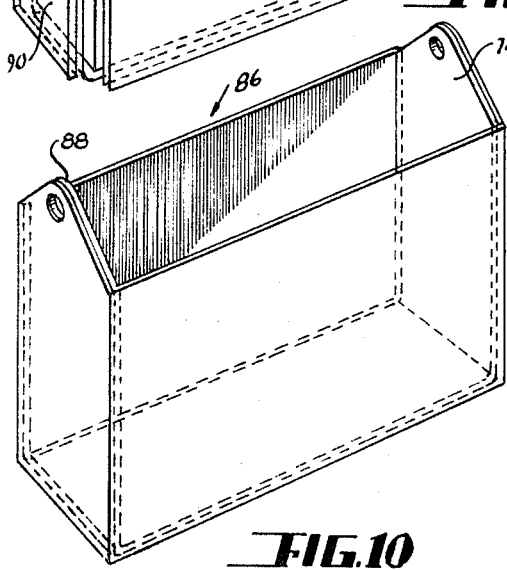
FIG. 10 is a perspective view of the outer case of the battery tray of FIG. 8.

The tray 70 of FIG. 8 can be manufactured using three inner cell casings 42 wrapped with the layers 46 and 48 of FIG. 3 along their sides and ends. The single row of casings 42 is then further wrapped along its ends and bottom by a layer 84 of woven fiberglass roving filled with resin and cut along its grain with its fibers oriented parallel to the margins of the row of inner casings 42. This inner cell assembly is then inserted into an outer case 86 shown in FIG. 10 which is of the same basic construction as the outer case 58 and includes additional layers 88 of resin filled with woven fiberglass roving inside the bottom and ends thereof. Layers of resin filled with fiberglass mat 90 are inserted between the outer walls of the inner cell assembly and the inner walls of the outer box 86. It will be observed that the walls of the construction of FIGS. 8, 9 and 10 have plural layers of resin filled with woven fiberglass roving and a mat in each of the walls and partitions thereof. Accordingly, the tray 70 in FIG. 8, just as in the case of the tray 30, is of a rugged construction, will resist distortion or deformation and will have good impact strength.

An air inhibited polyester resin is preferred in the construction of battery trays in accordance with this invention because of the good strength of the resin and because it is unaffected by battery acids. Air inhibited resins do not cure rapidly at their surfaces because of exposure to air. Therefore when parts of the battery tray of this invention are assembled with uncured resin therebetween, they will be integrally joined when the resin is fully cured.

Those skilled in the techniques of using fiberglass will appreciate that different types of woven rovings may be used for the different parts of the battery tray. Thus, the inner casings 42 may incorporate one or more layers of a tightly woven fiberglass rovings or cloth, whereas the fiberglass of the outer cases 58 and 86 may have a coarser weave. Similarly the layers used to wrap the inner cell assemblies may be of a coarser weave. As conventional, a thin mat may accompany each of the layers of roving to better hold the uncured resin.

Having thus described our invention, we claim:

1. A battery tray of a unitary self-supporting shape made from resin filled with fiberglass comprising a boxlike structure open at its upper end with a plurality of compartments therein including transvers partitions parallel to the end walls thereof separating at least some of said compartments, said transverse partitions each including at least one layer of resin filled with a fiberglass mat and two layers of resin filled with woven fiberglass roving and said end walls and the bottom wall of said tray having plural layers of resin filled with woven fiberglass roving with the fibers oriented parallel to marginal edges of said tray.

2. The battery tray of claim 1 further including a longitudinal partition perpendicular to said transverse partitions and parallel to the sidewalls of said tray, said longitudinal partition having at least four layers of resin filled with woven fiberglass roving and one layer of resin filled with a fiberglass mat which is thicker than said aforementioned fiberglass mats.

3. A battery tray comprising a unitary boxlike structure open at its upper end and having walls formed from resin filled with fiberglass, said battery tray having a plurality of vertically extending compartments therein of hollow rectangular tubular construction and mutually separated by partitions, each of the partitions and walls of said battery tray having plural layers of woven fiberglass roving with fibers oriented substantially parallel to marginal edges of said tray and each of the partitions and walls of said tray further having at least one layer of resin filled with a fiberglass mat.

4. The battery tray of claim 3 wherein said resin is a polyester resin.

5. A battery tray formed from resin filled with fiberglass comprising a boxlike hollow outer case open at its upper end, a pair of preformed inner cell assemblies each of a boxlike construction formed from preformed inner cell casings, said casings joined to form said cell assemblies prior to assembly of said cell assemblies in said outer case, each of said inner cell casings being of a hollow, rectangular and tubular construction open at its upper end, adjacent sidewalls of said cell casings forming partitions in said battery tray, one of said partitions being a center partition extending the length of said tray between said cell assemblies in parallel relation to the longer sidewalls of said tray, said center partition formed by adjacent sides of said inner cell assemblies and a layer of resin filled with fiberglass between said adjacent sides, said center partition and the longer sidewalls of said battery tray being thicker than the other of said partitions.